US010113928B2

(12) United States Patent
Je et al.

(10) Patent No.: US 10,113,928 B2
(45) Date of Patent: Oct. 30, 2018

(54) PRESSURE SENSOR AND A METHOD FOR MANUFACTURING THE SAME

(71) Applicant: ELECTRONICS AND TELECOMMUNICATIONS RESEARCH INSTITUTE, Daejeon (KR)

(72) Inventors: Chang Han Je, Daejeon (KR); Woo Seok Yang, Daejeon (KR); Sung Q Lee, Daejeon (KR); Chang Auck Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 188 days.

(21) Appl. No.: 15/234,911

(22) Filed: Aug. 11, 2016

(65) Prior Publication Data

US 2017/0241853 A1  Aug. 24, 2017

(30) Foreign Application Priority Data

Feb. 23, 2016  (KR) .......................... 10-2016-0021344

(51) Int. Cl.
*G01L 9/00* (2006.01)

(52) U.S. Cl.
CPC .................................. *G01L 9/0054* (2013.01)

(58) Field of Classification Search
None
See application file for complete search history.

(56) References Cited

U.S. PATENT DOCUMENTS

| 7,145,253 B1* | 12/2006 | Kim ..................... B81C 1/00333 |
| | | 257/790 |
| 7,629,657 B2 | 12/2009 | Partridge et al. |
| 8,261,617 B2 | 9/2012 | Choi et al. |
| 2004/0013867 A1* | 1/2004 | Martin ................ B81C 1/00476 |
| | | 428/309.9 |

(Continued)

FOREIGN PATENT DOCUMENTS

| KR | 10-2009-0058731 A | 6/2009 |
| KR | 10-2012-0041943 A | 5/2012 |
| KR | 10-2013-0039504 A | 4/2013 |

OTHER PUBLICATIONS

Jian Wang, et al., "A Surface Micromachined Pressure Sensor Based on Polysilicon Nanofilm Piezoresistors", Sensors and Actuators A: Physical, 2015, pp. 75-81, vol. 228, Elsevier B.V.

(Continued)

*Primary Examiner* — Andre J Allen (57) ABSTRACT

Provided is a pressure sensor including a substrate having a cavity therein, a partition wall disposed in the substrate to surround the cavity, a substrate insulation layer disposed on the top surface of the substrate to cover the cavity, a sensing unit disposed on the substrate insulation layer, and an encapsulation layer disposed on the substrate insulation layer to cover the sensing unit. The cavity may extend from a top surface toward a bottom surface of the substrate, the partition wall may have an inner sidewall exposed by the cavity, and at least a portion of the sensing unit may overlap the cavity when viewed in a plan view.

15 Claims, 7 Drawing Sheets

(56) References Cited

U.S. PATENT DOCUMENTS

| | | | |
|---|---|---|---|
| 2010/0199777 A1* | 8/2010 | Hooper | G01L 19/0084 |
| | | | 73/721 |
| 2012/0098076 A1 | 4/2012 | Lee et al. | |
| 2013/0094675 A1 | 4/2013 | Je et al. | |
| 2017/0003187 A1* | 1/2017 | Lim | G01L 9/0054 |
| 2017/0131168 A1* | 5/2017 | Shimoyama | G01L 9/0042 |
| 2017/0241853 A1* | 8/2017 | Je | G01L 9/0054 |

OTHER PUBLICATIONS

E. Kalvesten, et al., "The First Surface Micromachined Pressure Sensor for Cardiovascular Pressure Measurements", Dep. of Signals, Sensors and Systems, Royal Institute of Technology, 1998, pp. 574-579, IEEE, Stockholm, Sweden.

* cited by examiner

PRESSURE SENSOR AND A METHOD FOR MANUFACTURING THE SAME

CROSS-REFERENCE TO RELATED APPLICATIONS

This U.S. non-provisional patent application claims priority under 35 U.S.C. §119 of Korean Patent Application No. 10-2016-0021344, filed on Feb. 23, 2016, the entire contents of which are hereby incorporated by reference.

BACKGROUND

The present disclosure herein relates to a pressure sensor and a method for manufacturing the same, and more particularly, to a pressure sensor using a micro electro mechanical system (MEMS) technology and a method for manufacturing the same.

A pressure sensor is a device measuring pressure of gas or liquid. In recent years, a micro electro mechanical system (MEMS) pressure sensor fabricated by using a semiconductor technology is spotlighted because of its miniaturization, low cost, and high performance.

The pressure sensor is classified into a capacitive type pressure sensor and a piezo-resistive type pressure sensor. The piezo-resistive type pressure sensor detects variation of a resistance component according to stress occurrence of a piezo-resistive material provided on an upper portion of a sensing thin film to measure the pressure by deformation of the sensing thin film. The capacitive type pressure sensor detects variation between values of capacitances of a sensing electrode varied by the pressure and a fixed reference electrode to measure the pressure.

A conventional pressure sensor is fabricated by a bulk micromachining and a method for adhering different kinds of substrates. In more detail, a substrate constituting the sensing thin film through the bulk micromachining of the substrate and another substrate for constituting a sealed cavity disposed on an upper or lower portion of the sensing thin film are adhered to each other to fabricate the conventional pressure sensor. In this case, since process compatibility with a circuit unit is low, the circuit unit needs to be separately fabricated.

SUMMARY

The present disclosure provides an ultra-miniature and ultra-thin pressure sensor.

The present disclosure also provides a pressure sensor having improved detection sensitivity.

The object of the present invention is not limited to the aforesaid, but other objects not described herein will be clearly understood by those skilled in the art from descriptions below.

An embodiment of the inventive concept provides a pressure sensor including: a substrate having a cavity therein, in which the cavity extends from a top surface toward a bottom surface of the substrate; a partition wall disposed in the substrate to surround the cavity, in which the partition wall has an inner sidewall exposed by the cavity; a substrate insulation layer disposed on the top surface of the substrate to cover the cavity; a sensing unit disposed on the substrate insulation layer, wherein at least a portion of the sensing unit overlaps the cavity when viewed in a plan view; and an encapsulation layer disposed on the substrate insulation layer to cover the sensing unit.

In an embodiment, the substrate insulation layer may be connected to the partition wall to form one body.

In an embodiment, the partition wall may have a bottom surface lower than that of the cavity.

In an embodiment, the sensing unit may have a resistor.

In an embodiment, the sensing unit may be provided in plurality. The plurality of sensing units may include first to fourth resistors contacting a top surface of the substrate insulation layer and be arranged along a perimeter of the cavity, the first and third resistors may face each other in a first direction, and the second and fourth resistors may face each other in a second direction crossing the first direction, and the first and third resistors may include sensing resistors, and the second and fourth resistors may include reference resistors.

In an embodiment, the pressure sensor may further include a protective layer disposed between the substrate insulation layer and the encapsulation layer to cover the sensing unit. The encapsulation layer may extend into a through-hole passing through the substrate insulation layer and the protective layer over the cavity.

In an embodiment, the sensing unit may include: a reference electrode disposed on the substrate insulation layer; and a sensing electrode spaced apart from and disposed over the reference electrode, the sensing electrode being electrically insulated from the reference electrode. A gap region may be provided between the reference electrode and the sensing electrode over the cavity.

In an embodiment, the gap region may be connected to the cavity through a first through-hole passing through the substrate insulation layer and the reference electrode, and the encapsulation layer may extend into a second through-hole passing through the sensing electrode over the cavity.

In an embodiment, the first through-hole may have a diameter greater than that of the second through-hole.

In an embodiment, when viewed in a plan view, the partition wall may have a circular ring shape, an oval ring shape, or a ring shape having a triangular or more polygonal shape.

In an embodiment of the inventive concept, a method for manufacturing a pressure sensor, the method includes: etching a substrate to form a trench having a closed loop when viewed in a plan view; forming an insulation film filled into the trench and covering a top surface of the substrate; forming a sensing unit on the insulation film; forming a cavity in the substrate; and forming an encapsulation layer covering the sensing unit on the substrate in which the cavity is formed. One portion of the insulation film in the trench may be defined as a partition wall, and the forming of the cavity in the substrate may include removing a portion of the substrate, which is surrounded by the partition wall.

In an embodiment, the other portion of the insulation film covering the top surface of the substrate may be defined as a substrate insulation layer, and the forming of the sensing unit may include: depositing a piezo-resistive material on the substrate insulation layer; and patterning the deposited piezo-resistive material to form a resistor.

In an embodiment, before the forming of the cavity, the method may further include: forming a protective layer covering the sensing unit on the substrate insulation layer; and etching the substrate insulation layer and the protective layer to form a through-hole exposing the one portion of the substrate.

In an embodiment, the other portion of the insulation film covering the top surface of the substrate may be defined as a substrate insulation layer. The forming of the sensing unit may include: forming a reference electrode on the substrate insulation layer; etching the reference electrode and the substrate insulation layer to form a first through-hole exposing the one portion of the substrate; forming a sacrificial layer filled into the first through-hole on the reference electrode; forming a sensing electrode covering the sacrificial layer; forming a second through-hole passing through the sensing electrode to expose the sacrificial layer; and removing the sacrificial layer through the second through-hole.

In an embodiment, the removing of the one portion of the substrate may use a wet etching process.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings.

DETAILED DESCRIPTION

Exemplary embodiments of the present invention will be described with reference to the accompanying drawings so as to sufficiently understand constitutions and effects of the present invention. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Further, the present invention is only defined by scopes of claims. A person with ordinary skill in the technical field of the present invention pertains will be understood that the present invention can be carried out under any appropriate environments. Like reference numerals refer to like elements throughout.

In the following description, the technical terms are used only for explaining a specific exemplary embodiment while not limiting the present disclosure. The terms of a singular form may include plural forms unless referred to the contrary. The meaning of 'comprises' and/or 'comprising' specifies a component, a step, an operation and/or an element does not exclude other components, steps, operations and/or elements.

In the specification, it will be understood that when a layer (or film) is referred to as being 'on' another layer or substrate, it can be directly on the other layer or substrate, or intervening layers may also be present.

Also, though terms like a first, a second, and a third are used to describe various regions and layers (or films) in various embodiments of the present invention, the regions and the layers are not limited to these terms. These terms are used only to discriminate one region or layer (or film) from another region or layer (or film). Therefore, a layer referred to as a first layer in one embodiment can be referred to as a second layer in another embodiment. An embodiment described and exemplified herein includes a complementary embodiment thereof. Like reference numerals refer to like elements throughout.

Additionally, the embodiment in the detailed description will be described with sectional views as ideal exemplary views of the present invention. Also, in the figures, the dimensions of layers and regions are exaggerated for clarity of illustration. Accordingly, shapes of the exemplary views may be modified according to manufacturing techniques and/or allowable errors. Therefore, the embodiments of the present invention are not limited to the specific shape illustrated in the exemplary views, but may include other shapes that may be created according to manufacturing processes. For example, an etched region having a right angle illustrated in the drawings may have a round shape or a shape having a predetermined curvature. Areas exemplified in the drawings have general properties, and are used to illustrate a specific shape of a semiconductor package region. Thus, this should not be construed as limited to the scope of the present invention.

Unless terms used in embodiments of the present invention are differently defined, the terms may be construed as meanings that are commonly known to a person skilled in the art.

Hereinafter, the present invention will be described in detail by explaining preferred embodiments of the invention with reference to the attached drawings.

Figure 1:
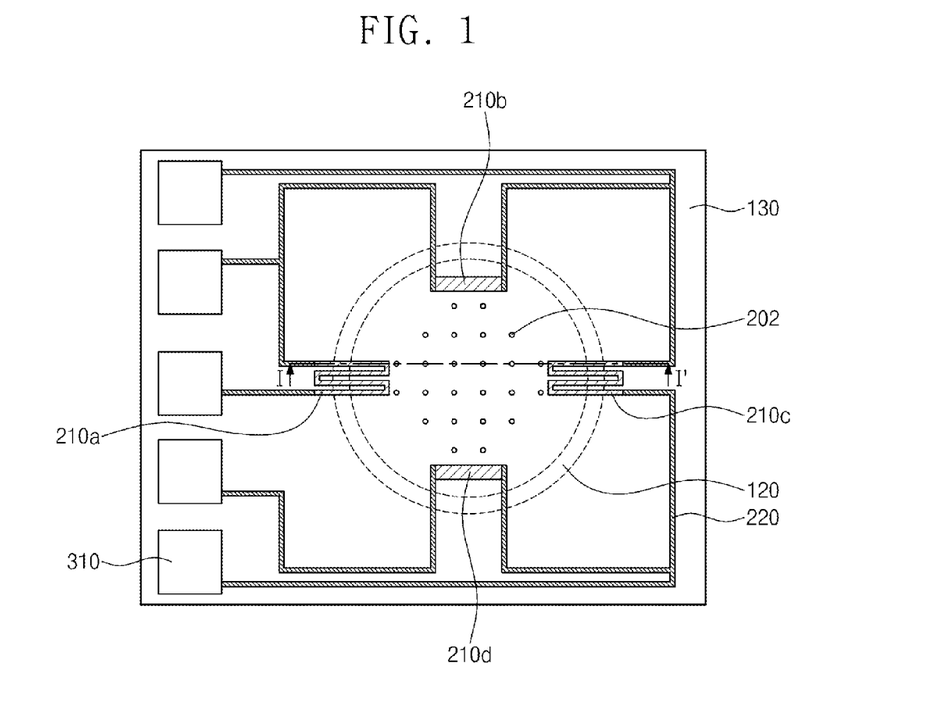
FIG. 1 is a plan view for explaining a pressure sensor according to embodiments of the inventive concept.
Figure 2:
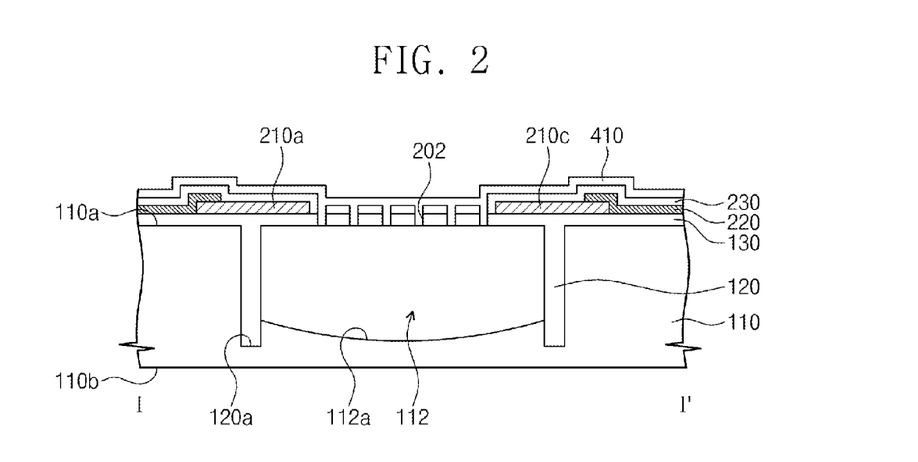
FIG. 2 is a cross-sectional view taken along line I-I' of FIG. 1.
Figure 3:
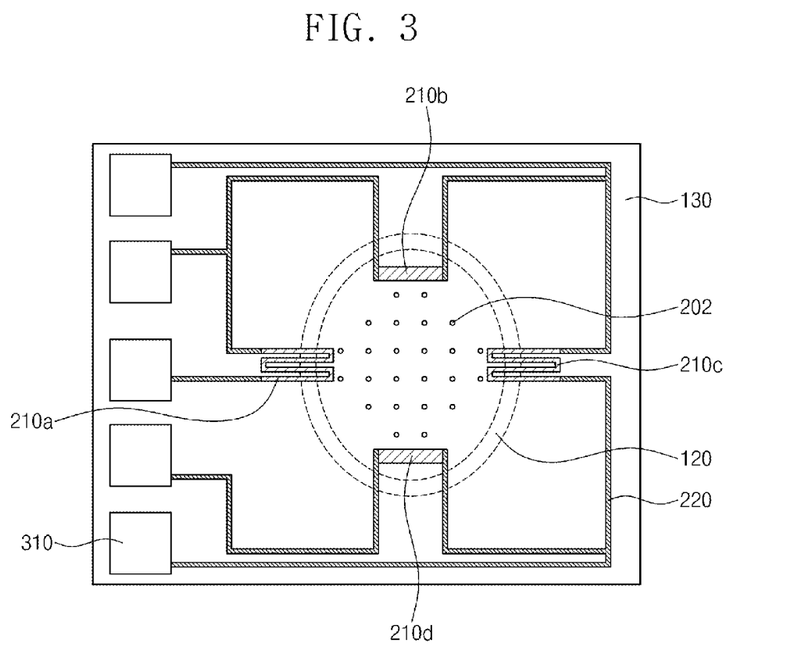
FIGS. 3 and 4 are cross-sectional views for explaining various modified examples of a partition wall.
Figure 4:
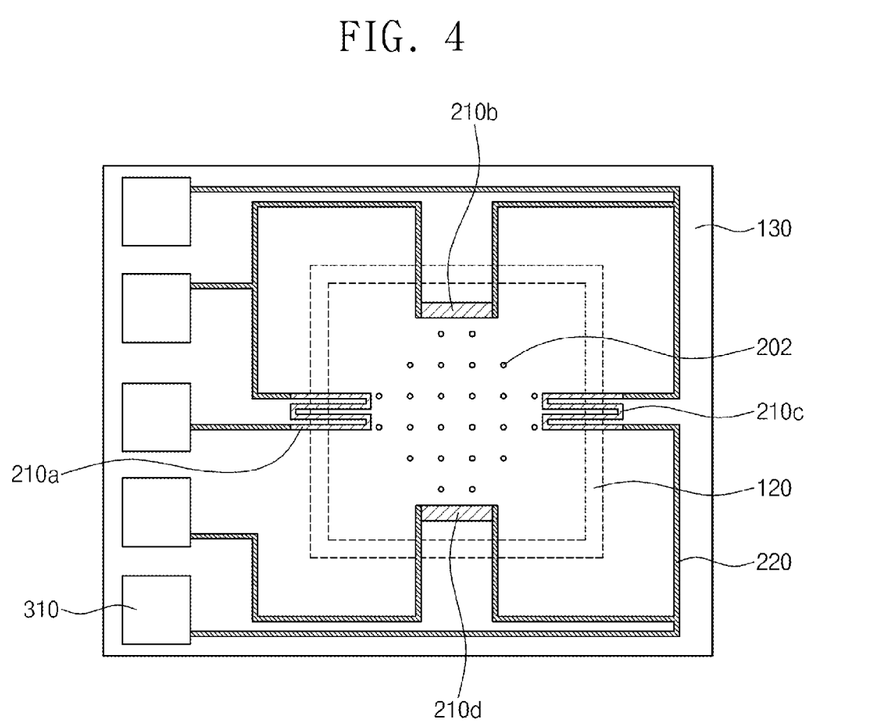

FIG. 1 is a plan view for explaining a pressure sensor according to embodiments of the inventive concept FIG. 2 is a cross-sectional view taken along line I-I' of FIG. 1. FIGS. 3 and 4 are cross-sectional views for explaining various modified examples of a partition wall. For convenience of description, partial components (e.g., protective layer and encapsulation layer) are omitted in FIGS. 1, 3, and 4.

Referring to FIGS. 1 and 2, a substrate 110 having a top surface 110a and a bottom surface 110b, which are disposed opposite to each other, may be provided. The substrate 110 may include silicon or a compound semiconductor. For example, the substrate 110 may include a III-V group compound semiconductor material such as gallium arsenic (GaAs) and indium phosphorus (InP).

The substrate 110 may have a cavity 112 therein. For example, the cavity 112 may be recessed from the top surface 110a toward the bottom surface 110b of the substrate 110. Here, the cavity 112 may not penetrate through the entire substrate 110. That is, the cavity 112 may have a shape in which the top surface 110a of the substrate 110 is recessed. In another perspective, a bottom surface 112a of the cavity 112 may be defined by the substrate 110, and an upper end thereof may be opened. When viewed in a plan view, the cavity 112 may be disposed on a central portion of the substrate 110. The cavity 112 may have a planar shape including a circular shape, an oval shape, or a shape having a triangular or more polygonal shape. The upper end of the cavity 112 may be sealed by a substrate insulation layer 130 and an encapsulation layer 410. Accordingly, the cavity 112 may provide closed atmosphere.

A partition wall 120 may be provided in the substrate 110. The partition wall 120 may surround the cavity 112. In detail, when viewed in a plan view, the partition wall 120 may have a closed loop shape provided along an edge of the cavity 112. That is, the cavity may have a planar shape of a ring shape surrounding the cavity 112. The partition wall may have a planar shape that is varied according to the planar shape of the cavity 112. For example, as illustrated in FIG. 1, the cavity 120 may have a circular ring shape when viewed in a plan view. For another example, as illustrated in FIG. 3, the cavity 120 may have an oval ring shape when viewed in a plan view. Alternatively, the partition wall 120 may have a ring shape having a triangular or more polygonal shape. For example, as illustrated in FIG. 4, the cavity 120 may have a rectangular ring shape when viewed in a plan view. An inner wall of the partition wall 120 may be exposed by the cavity 112. That is, a side surface of the cavity 112 may be defined by the inner wall of the partition wall 120. According to an embodiment of the inventive concept, the partition wall 120 may have a bottom surface 120a that is lower than a bottommost point of a bottom surface 112a of the cavity 112. However, an embodiment of the inventive concept is not limited thereto. The partition wall 120 may define a region in which the substrate 110 is etched in a cavity forming process. The partition wall 120 may include a material that has etching selectivity different from that of the substrate 110. For example, the partition wall 120 may include a silicon oxide or a silicon nitride.

A substrate insulation layer 130 may be disposed on the substrate 110. The substrate insulation layer 130 may contact the top surface 110a of the substrate 110 and cover the upper end of the cavity 112. That is, a portion of the substrate insulation layer 130 may float over the cavity 112. As a result, a top surface of the cavity 112 may be defined by the substrate insulation layer 130. The substrate insulation layer 130 may be integrated with the partition wall 120. That is, the substrate insulation layer 130 and the partition wall 120 may be coupled to each other to provide one insulation film. The substrate insulation layer 130 may include the same material as that of the partition wall 120. For example, the substrate insulation layer 130 may include a silicon oxide or a silicon nitride. Alternatively, the substrate insulation layer 130 and the partition wall 120 may include materials different from each other or may not be integrated with each other. The substrate insulation layer 130 may insulate the substrate 110 from a resistor 210 that will be described later and have a shape varied by receiving external pressure.

The resistor 210 may be disposed on the substrate insulation layer 130. The resistor 210 may contact a top surface of the substrate insulation layer 130, and at least a portion of the resistor 210 may be disposed over the cavity 112. The resistor 210 may be made of a piezo-resistive material. For example, the piezo-resistive material may include silicon. According to an embodiment, the resistor 210 may operate as a sensing unit. In detail, the resistor 210 may have resistance varied according to deformation of the substrate insulation layer 130. The resistor 210 may be used as a unit converting the external pressure into an electric signal, and the pressure sensor may detect the variation of the resistance of the resistor 210 to measure the external pressure. That is, the pressure sensor according to an embodiment may be a piezo-resistive type pressure sensor.

The resistor 210 may be provided in plurality. For example, as illustrated in FIG. 1, the resistor 210 may include first to fourth resistors 210a, 210b, 210c, and 210d that are arranged at an angular distance of 90° along a perimeter of the cavity 112. The first and third resistors 210a and 210c may face each other in a first direction, and the second and fourth resistors 210b and 210d may face each other in a second direction crossing the first direction. Here, the second and fourth resistors 210b and 210d may be used as a reference resistor, and the first and third resistors 210a and 210c may be used as a sensing resistor. However, an embodiment of the inventive concept is not limited thereto. The number and arrangement of the resistor 210 may be changed according to a circuit to be configured.

Conductive lines 220 and electrode pads 310 may be disposed on the substrate insulation layer 130. The electrode pads 310 may be respectively connected to the first to fourth resistors 210a to 210d through the conductive lines 220. According to an embodiment, although the electrode pads 310 are arranged to form one row disposed adjacent to the first resistor 210a, embodiments of the inventive concept is not limited thereto. Meanwhile, although not shown, the first to fourth resistors 210a to 210d may be electrically connected to a semiconductor circuit (not shown) provided on the substrate 110 through the conductive lines 220.

The conductive lines 220 and the electrode pads 310 may be made of a conductive material such as metal.

A protective layer 230 covering the resistors 210 and the conductive lines 220 may be disposed on the substrate insulation layer 130. The protective layer 230 may prevent the substrate insulation layer 130, the resistor 210, and the conductive lines 220 from being etched in the cavity forming process. According to an embodiment, before the cavity is provided, when the electrode pads 310 or the semiconductor circuit (not shown) are provided, the protective layer 230 may prevent the electrode pads 310 or the semiconductor circuit (not shown) from being etching while the cavity 112 is formed. The protective layer 230 may include a material that has etching selectivity different from that of the substrate 110. For example, the protective layer 230 may include a silicon oxide or a silicon nitride.

A first through-hole 202 passing through the substrate insulation layer 130 and the protective layer 230 may be provided. The first through-hole 202 may vertically penetrate through the substrate insulation layer 130 and the protective layer 230. The first through-hole 202 may be disposed over the cavity 112 and overlap the cavity 112. The first through-hole 202 may be used as a passage through which etchant moves during an etching process for forming the cavity 112. The first through-hole 202 may have a diameter of 0.1 µm to 10 µm. The first through-hole 202 may be provided in plurality or singularity.

An encapsulation layer 410 may be disposed on the protective layer 230. The encapsulation layer 410 may cover the protective layer 230. Here, the encapsulation layer 410 may be filled into the first through-hole 202. Through this, the encapsulation layer 410 may seal the cavity 112. For example, the encapsulation layer 410 may include a silicon oxide or a silicon nitride. For another example, the encapsulation layer 410 may include polyethylene terephthalate (PET) and poly carbonate (PC).

Hereinafter, a method for fabricating the pressure sensor according to an embodiment of the inventive concept will be described in detail.

FIGS. 5A to 5E are cross-sectional views for explaining the method for fabricating the pressure sensor according to embodiments of the inventive concept.

Figure 5A:
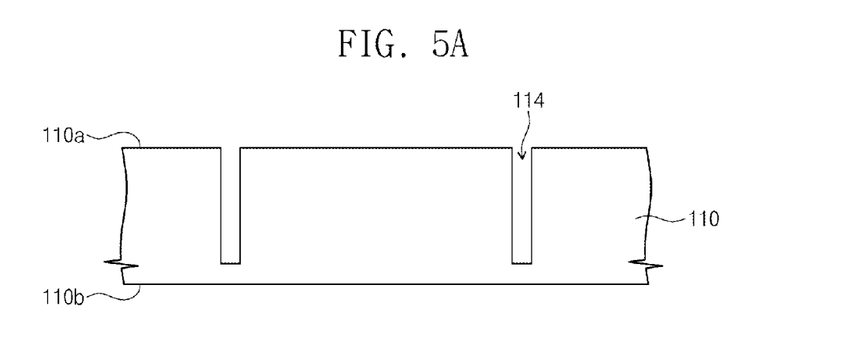
FIGS. 5A to 5E are cross-sectional views illustrating a method for fabricating the pressure sensor according to embodiments of the inventive concept.

Referring to FIG. 5A, a substrate 110 having a top surface 110a and a bottom surface 110b, which are disposed opposite to each other, may be provided. The substrate 110 may include silicon or a compound semiconductor. For example, the substrate 110 may include a III-V group compound semiconductor material such as gallium arsenic (GaAs) or indium phosphorus (InP).

A trench 114 may be formed in the substrate 110. For example, the top surface 110a of the substrate 110 may be etched to form the trench 114. The trench 114 may have a closed loop shape when viewed in a plan view. In detail, the planar shape of the trench 114 may be one of a circular ring shape, an oval ring shape, and a ring shape having a triangular or more polygonal shape.

Figure 5B:
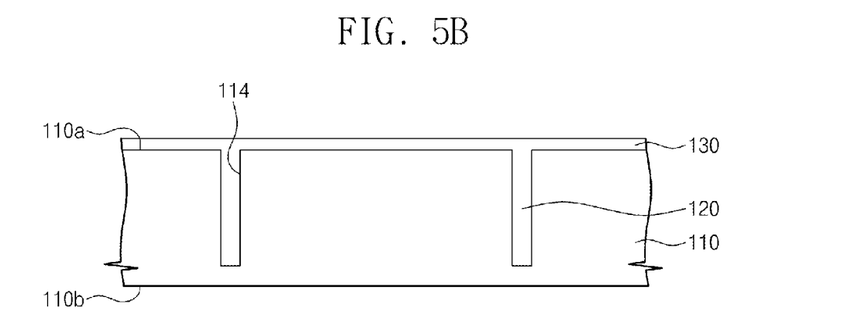

Referring to FIG. 5B, an insulation film filled into the trench 114 and covering the top surface 110a of the substrate 110 may be formed. The insulation film may be formed by using a thermal oxidation process or a CVD process. For example, the insulation film may include a silicon oxide or a silicon nitride. One portion of the insulation film filling the trench 114 may be defined as a partition wall 120, and the other portion of the insulation film covering the top surface 110a of the substrate 110 may be defined as a substrate insulation layer 130. That is, the partition wall 120 and the substrate insulation layer 130 may be simultaneously formed and coupled to each other to form one integrated insulation film.

As the partition wall 120 is formed in the trench 114, the partition wall 120 may have a planar shape that is the same as that of the trench 114. For example, when viewed in a plan view, the partition wall 120 may have a closed loop shape. In detail, the planar shape of the trench 120 may be one of a circular ring shape, an oval ring shape, and a ring shape having a triangular or more polygonal shape. Meanwhile, a portion of the substrate 110 surrounded by the partition wall 120 may be defined as a cavity forming region. According to another embodiment, the substrate insulation layer 130 may be made of a material different from that of the partition wall 120. Here, each of the partition wall 120 and the substrate insulation layer 130 may be formed through separated processes different from each other.

Figure 5C:
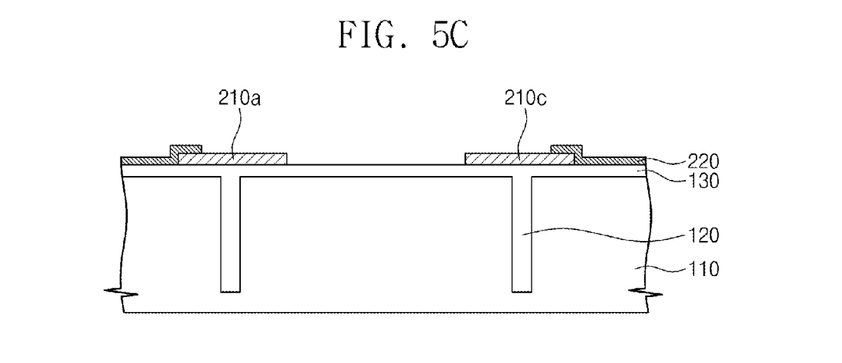

Referring to FIG. 5C, resistors 210a to 210d may be formed on the substrate insulation layer 130. In detail, a piezo-resistive material may be deposited on the substrate 110 through a deposition process such as the CVD process. Thereafter, the deposited piezo-resistive material may be patterned to form the resistors 210a to 210d. A portion of the patterned piezo-resistive material may overlap a portion of the cavity forming region. The piezo-resistive material may include silicon. Thereafter, the deposited piezo-resistive material may be patterned. Through the patterning process, a portion of the substrate insulation layer 130 may be exposed.

Conductive lines 220 may be formed on the substrate insulation layer 130. For example, a conductive material may be deposited on the substrate insulation layer 130, and then the deposited conductive layer may be patterned to form the conductive lines. The conductive lines 220 may contact the resistors 210a to 210d. The conductive lines 220 may extend along the top surface of the substrate insulation layer 130 to the outside of the substrate insulation layer 130.

Figure 5D:
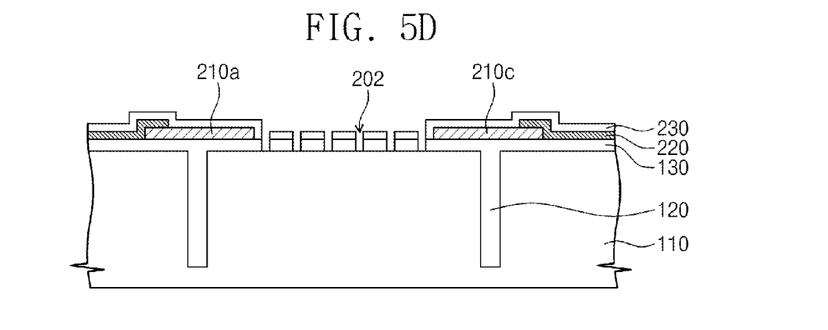

Referring to FIG. 5d, a protective layer 230 may be formed on the substrate insulation layer 130. For example, the protective layer 230 may be formed by using a CVD process. Here, the protective layer 230 may cover the substrate insulation layer 130, the resistors 210a to 210d, and the conductive lines 220. The protective layer 230 may include a silicon oxide or a silicon nitride.

A first through-hole 202 passing through the protective layer 230 and the substrate insulation layer 130 to expose the top surface 110a of the substrate 110 may be formed. One region of the protective layer 230 and the substrate insulation layer 130 may be removed to form the first through-hole 202. For example, the one region of the protective layer 230 and the substrate insulation layer may be removed by an etching process.

Figure 5E:
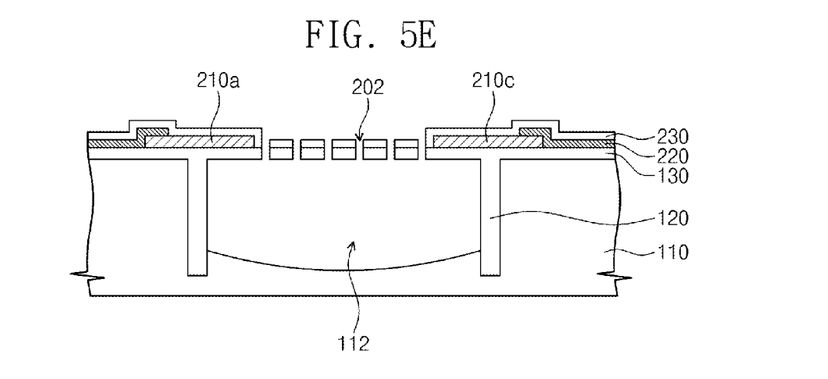

Referring to FIG. 5E, a cavity 112 may be formed. A portion of the substrate 110 surrounded by the partition wall 120, i.e., a cavity forming region, may be removed to form the cavity 112 in the substrate 110. For example, the cavity forming region of the substrate 110 may be removed by the etching process. Etchant or etching gas may be introduced through the first through-hole 202 and react with a portion of the substrate 110 in the cavity forming region. The portion of the substrate 110 reacted with the etching gas may be removed to the outside through the first through-hole 202. Here, the substrate 110 may be etched from the top surface 110a of the substrate 110 toward an inside thereof, and a depth in which the substrate 110 is etched may be higher than a bottom surface (see 120a in FIG. 2) of the partition wall 120.

Referring to FIG. 2 again, the encapsulation layer 410 may be formed on the protective layer 230. The encapsulation layer 410 may cover the protective layer 230 and be filled into the first through-hole 202 while not formed in the cavity 112. That is, the cavity 112 may be sealed by the encapsulation layer 410. The encapsulation layer 410 may be formed under various pressures as necessary. Here, the pressure in the cavity may be determined according to pressure atmosphere at which the encapsulation layer 410 is formed. For example, the encapsulation layer 410 may be formed such that a silicon oxide or a silicon nitride is deposited on the protective layer 230. For another example, the encapsulation layer 410 may be formed such that an organic material such as polyethylene terephthalate (PET) and poly carbonate (PC) is applied on the protective layer 230. Here, the deposited organic material may not be introduced into the cavity 112 due to surface tension.

In the pressure sensor according to the embodiments of the inventive concept, the partition wall is formed in the bulk silicon substrate to limit the region in which the cavity is formed. Due to this, the ultra-thin pressure sensor having a small thickness may be formed, and the cavity having a desired shape may be easily formed as necessary.

The method for fabricating the pressure sensor according to embodiments of the inventive concept performs the cavity forming and sealing process as a post process. Thus, the cavity having various inner pressures without limitation caused by the post process may be formed, and various sealing materials may be used to form the encapsulation layer.

Figure 6:
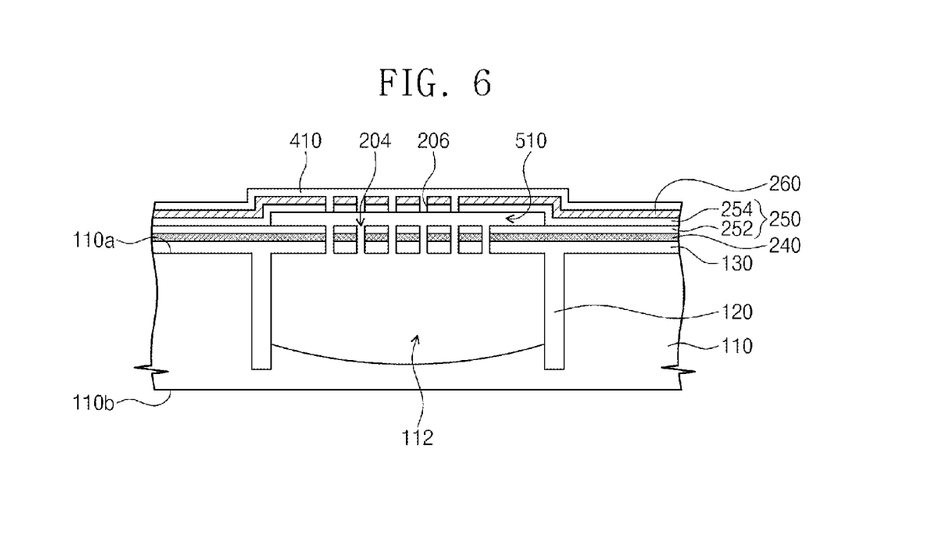
FIG. 6 is a cross-sectional view for explaining a pressure sensor according to another embodiment of the inventive concept.

FIG. 6 is a cross-sectional view for explaining a pressure sensor according to another embodiment of the inventive concept. For convenience of description, like reference numerals refer to like elements that are substantially the same as the embodiment in FIGS. 1 and 2, and detailed description of the elements will be omitted.

Referring to FIG. 6, the pressure sensor according to embodiments of the inventive concept may be a capacitive type pressure sensor unlike the pressure sensor in FIGS. 1 and 2.

A substrate 110 may be provided. The substrate 110 may include silicon or a compound semiconductor. The substrate 110 may have a cavity 112 in which a top surface 110a thereof is recessed. The cavity 112 may be disposed on a central portion of the substrate 110 when viewed in a plan view. The cavity 112 may have a planar shape of a circular shape, an oval shape, and a shape having a triangular or more polygonal shape. The cavity 112 may provide a closed state.

The partition wall 120 may be provided in the substrate 110. As described in the above embodiment by using FIGS. 3 and 4, when viewed in a plan view, the partition wall 120 may have a closed loop shape formed along the edge of the cavity 112. The partition wall 120 may have a bottom surface 120a that is lower than a bottommost point of a bottom surface 112a of the cavity 112. The partition wall 120 may include a material that has etching selectivity different from that of the substrate 110.

A substrate insulation layer 130 may be disposed on the substrate 110.

The substrate insulation layer 130 may contact the top surface 110a of the substrate 110 and cover an upper end of the cavity 112. The substrate insulation layer 130 may be integrated with the partition wall 120.

A reference electrode 240 may be disposed on the substrate 110. In detail, the reference electrode 240 may contact a top surface of the substrate insulation layer 130, and at least a portion of the reference electrode 240 may be disposed over the cavity 112. For example, the reference electrode 240 may include a conductive material such as metal or polysilicon. For example, the reference electrode 240 may be constituted by a metal electrode layer. The reference electrode 240 may form a capacitor together with a sensing electrode 260 that will be described later.

The sensing electrode 260 may be provided over the reference electrode 240. In detail, one portion of the sensing electrode 260 may be spaced from the reference electrode 240, and the other portion of the sensing electrode 260 may cover the reference electrode 240. That is, the sensing electrode 260 may have a protruding portion defining a gap region 510 between the reference electrode 240 and the sensing electrode 260. Here, the gap region 510 may be a substantially empty space that is filled with air without a solid material. When viewed in a plan view, the protruding portion of the sensing electrode 260 may overlap the cavity 112 and has a planar shape of a circular shape, an oval shape, and a shape having a triangular or more polygonal shape. The sensing electrode 260 may be made of a conductive material. For example, the sensing electrode 260 may include metal or polysilicon.

Here, the sensing electrode 260 and the reference electrode 240 may operate as a sensing unit. In detail, the sensing electrode 260 and the reference electrode 240 may be electrically insulated by the gap region 510. Accordingly, the sensing electrode 260 may constitute a capacitor as a counter electrode of the reference electrode 240 When external pressure is transmitted to the sensing electrode 260, a portion of the sensing electrode 260, which is spaced apart from the reference electrode 240, may be deformed by the transmitted external pressure. A gap between the sensing electrode 260 and the reference electrode 240 may be varied according to the external pressure. Through this, a capacitance of the capacitor constituted by the sensing electrode 260 and the reference electrode 240 may be varied, and the pressure sensor may detect the variation of the capacitance to measure the external pressure.

An inter-electrode insulation layer 250 may be disposed between the reference electrode 240 and the sensing electrode 260. The inter-electrode insulation layer 250 may include a first inter-electrode insulation layer 252 and a second inter-electrode insulation layer 254. The first inter-electrode insulation layer 252 may be disposed on the reference electrode 240. For example, the first inter-electrode insulation layer 252 may contact the reference electrode 240. That is, the first inter-electrode insulation layer 252 may cover the reference electrode 240. Here, a top surface of the first inter-electrode insulation layer 252 may be exposed by the gap region 510. The second inter-electrode insulation layer 254 may be disposed on the first inter-electrode insulation layer 252. For example, the second inter-electrode insulation layer 254 may contact a bottom surface of the sensing electrode 260. Here, the bottom surface of the second inter-electrode insulation layer 254 may be exposed by the gap region 510. According to another embodiment, the inter-electrode insulation layer 250 may include only one of the first inter-electrode insulation layer 252 and the second inter-electrode insulation layer 254 as necessary. The inter-electrode insulation layer 250 may electrically insulate the reference electrode 240 from the sensing electrode 260. The inter-electrode insulation layer 250 may include the same material as that of the substrate insulation layer 130. For example, the inter-electrode insulation layer 250 may include a silicon oxide or a silicon nitride. The inter-electrode insulation layer 250 may exposed a portion of the top surface of the reference electrode 240. Here, when viewed in a plan view, the exposed portion of the top surface of the reference electrode 240 may not overlap the cavity. The exposed portion of the top surface of the reference electrode 240 may serve as a pad for being electrically connected to the reference electrode 240.

A second through-hole 204 passing through the reference electrode 240 and the first inter-electrode insulation layer 252 may be formed. The second through-hole may vertically penetrate through the reference electrode 240. The second through-hole 204 may be disposed over the cavity 112 and overlap the cavity 112. The second through-hole 204 may be used as a passage through which etchant moves during the etching process for forming the cavity 112. The second through-hole 204 may have a diameter of 0.1 µm to 10 µm. The second through-hole 204 may be provided in plurality or singularity.

A third through-hole 206 passing through the sensing electrode 260 and the second inter-electrode insulation layer 254 may be formed. The third through-hole 206 may vertically penetrate through the sensing electrode 260. The third through-hole 206 may be connected to the cavity 112 through the gap region 510 and the second through-hole 204. The third through-hole 206 may be used as a passage through which etchant moves during the etching process for forming the gap region 510. The third through-hole 206 may have a diameter of 0.1 µm to 10 µm. The third through-hole 206 may have a diameter less than that of the second through-hole 204. The third through-hole 206 may be provided in plurality or singularity.

The encapsulation layer 410 may be disposed on the protective layer 260. The encapsulation layer 410 may cover the sensing electrode 260. Here, the encapsulation layer 410 may be filled into the third through-hole 206. Through this, the encapsulation layer 410 may seal the cavity 112 and the gap region 510. For example, the encapsulation layer 410 may include a silicon oxide or a silicon nitride. For another example, the encapsulation layer 410 may include polyethylene terephthalate (PET) and poly carbonate (PC). The encapsulation layer 410 may expose a portion of the top surface of the sensing electrode 260. Here, when viewed in a plan view, the exposed portion of the top surface of the sensing electrode 260 may not overlap the cavity 112. The exposed portion of the top surface of the sensing electrode 260 may serve as a pad for being electrically connected to the sensing electrode 260.

FIGS. 7A to 7F are cross-sectional views for explaining a method for fabricating a pressure sensor according to other embodiments of the inventive concept. For convenience of description, like reference numerals refer to like elements that are substantially the same as the embodiment in FIGS. 56 and 2, and detailed description of the elements will be omitted.

As described with reference to FIG. 5A, a substrate 110 may be provide. The substrate 110 may include silicon or a compound semiconductor.

A trench 114 may be formed in the substrate 110. For example, a top surface 110a of the substrate 110 may be etched to form the trench 114. The trench 114 may have a closed loop shape when viewed in a plan view.

As described with reference to FIG. 5B, an insulation film filled into the trench 114 and covering the top surface 110a of the substrate 110 may be formed. One portion of the insulation film filled into the trench 114 may be defined as a partition wall 120, and the other portion of the insulation film covering the top surface 110a of the substrate 110 may be defined as a substrate insulation layer 130. As the partition wall 120 is formed in the trench 114, the partition wall 120 may have a planar shape that is the same as that of the trench 114. Meanwhile, a portion of the substrate 110, which is surrounded by the partition wall 120, may be defined as a cavity forming region.

Figure 7A:
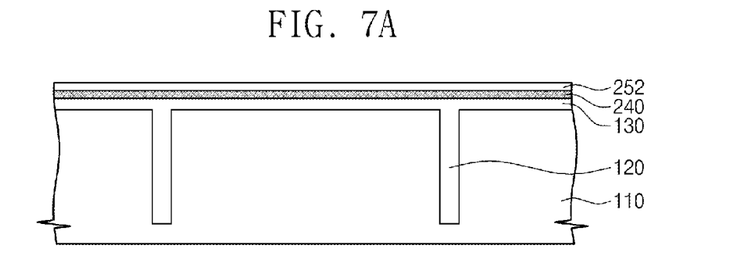
FIGS. 7A to 7F are cross-sectional views for explaining a method for fabricating a pressure sensor according to other embodiments of the inventive concept.

Referring to FIG. 7A, a reference electrode 240 may be formed on the substrate insulation layer 130. In detail, a conductive material may be deposited on the substrate insulation layer 130 through a deposition process. The reference electrode 240 may cover the substrate insulation layer 130. The conductive material may include metal or polysilicon.

Thereafter, a first inter-electrode insulation layer 252 may be formed on the reference electrode 240. In detail, an insulation material may be deposited on the reference electrode 240 through a deposition process such as a CVD process. For example, the insulation material may include a silicon oxide or a silicon nitride.

Figure 7B:
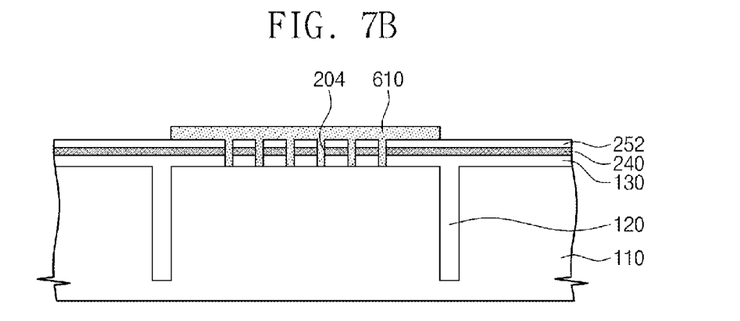

Referring to FIG. 7B, a second through-hole 204 passing through the reference electrode 240 and the first inter-electrode insulation layer 252 to expose the top surface 110a of the substrate 110 may be formed. One region of the reference electrode 240 and the first inter-electrode insulation layer 252 may be removed to form the second through-hole 204. For example, the one region of the reference electrode 240 and the first inter-electrode insulation layer 252 may be removed by an etching process.

A sacrificial layer 610 may be formed on the first inter-electrode insulation layer 252. In detail, an organic material may be deposited on the first inter-electrode insulation layer 252 through the deposition process such as the CVD process. Thereafter, the deposited organic material layer may be patterned to form the sacrificial layer 610. The sacrificial layer 610 may overlap the cavity forming region. The sacrificial layer 610 may be filled into the second through-hole 204.

Figure 7C:
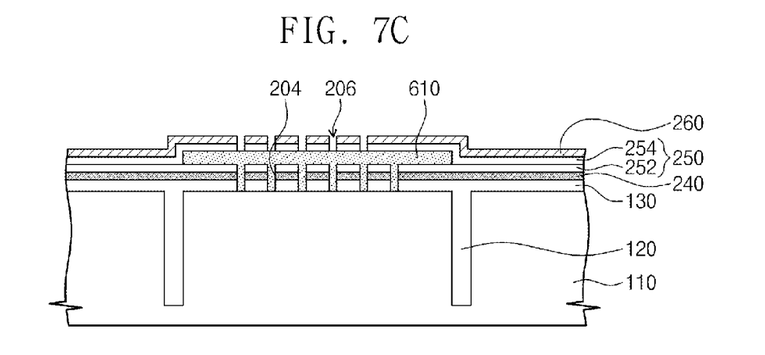

Referring to FIG. 7C, a second inter-electrode insulation layer 254 may be formed on the sacrificial layer 610. In detail, the second inter-electrode insulation layer 254 may be deposited through the deposition process such as the CVD process. For example, the deposited insulation material may cover top and side surfaces of the sacrificial layer 610 and a top surface of the first inter-electrode insulation layer 252. For example, the insulation material may include a silicon oxide or a silicon nitride. According to another embodiment, only one of the first inter-electrode insulation layer 252 and the second inter-electrode insulation layer 254 may be formed.

A sensing electrode 260 may be formed on the second inter-electrode insulation layer 254. In detail, a conductive material may be deposited on the second inter-electrode insulation layer 254 through a deposition process. The sensing electrode 260 may cover the second inter-electrode insulation layer 254. The conductive material may include metal or polysilicon. The sensing electrode 260 may be spaced apart from the reference electrode 240 by the sacrificial layer.

A third through-hole 206 passing through the sensing electrode 260 and the second inter-electrode insulation layer 254 to expose a top surface of the sacrificial layer 610 may be formed. One region of the sensing electrode 260 and the second inter-electrode insulation layer 254 may be removed to form the third through-hole 206. For example, the one region of the sensing electrode 260 and the second inter-electrode insulation layer 254 may be removed by an etching process.

Figure 7D:
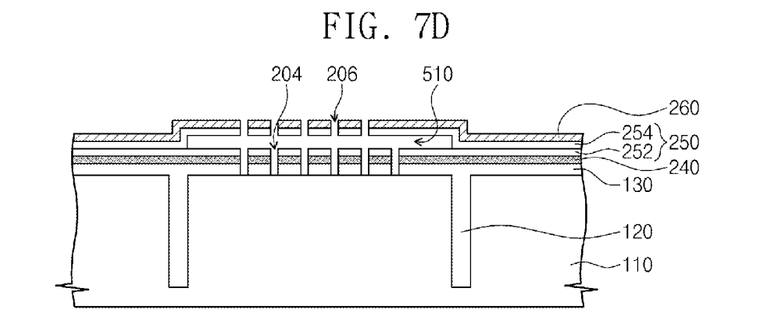

Referring to FIG. 7D, a gap region 510 may be formed. For example, the sacrificial layer 610 may be removed by the etching process. Etchant or etching gas may be introduced through the third through-hole 206 to react with the sacrificial layer 610. The sacrificial layer 610 reacted with the etching gas may be removed to the outside through the third through-hole 206.

Figure 7E:
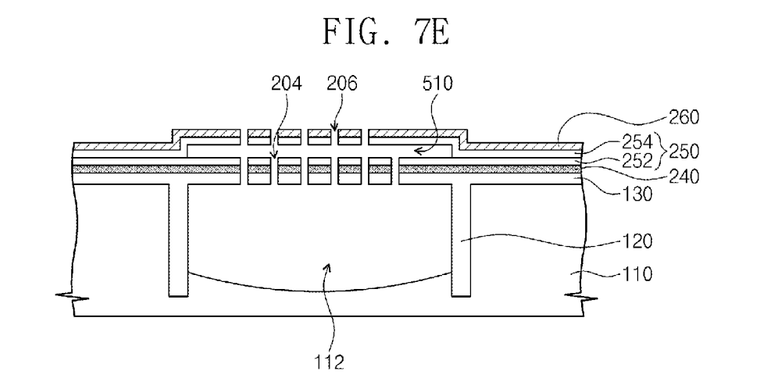

Referring to FIG. 7E, a cavity 112 may be formed. The portion of the substrate 110, which is surrounded by the partition wall 120, i.e., the cavity forming region, may be removed to form the cavity 112 in the substrate 110. For example, the cavity forming region of the substrate 110 may be removed by the etching process. Etchant or etching gas may be introduced through the third through-hole 206 and the second through-hole 204 and react with a portion of the substrate 110 in the cavity forming region. The portion of the substrate 110 reacted with the etching gas may be removed to the outside through the second through-hole 204 and the third through-hole 206. Here, the substrate 110 may be etched from the top surface 110a thereof toward an inside thereof, and a depth in which the substrate 110 is etched may be higher than a bottom surface of the partition wall 120.

Figure 7F:
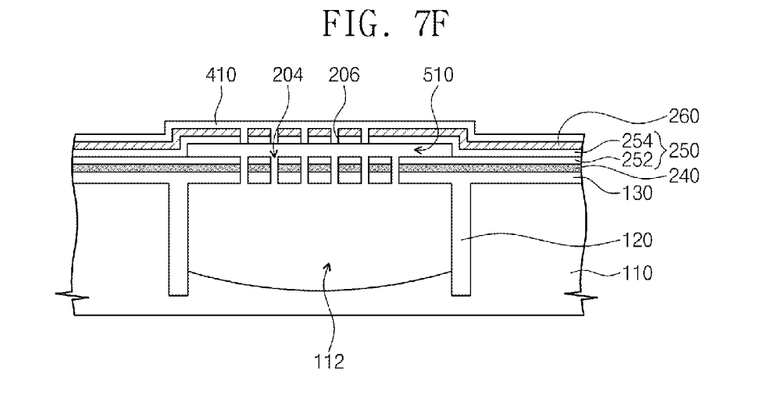

Referring to FIG. 7F, the encapsulation layer 410 may be formed on the sensing electrode 260. The encapsulation layer 410 may cover the sensing electrode 260 and be filled into the third through-hole 206 while not formed in the gap region 510. That is, the gap region 510 and the cavity 112 may be sealed by the encapsulation layer 410. The encapsulation layer 410 may be formed under various pressures as necessary. Here, the pressure in the cavity may be determined according to pressure atmosphere at which the encapsulation layer 410 is formed. For example, the encapsulation layer 410 may be formed such that a silicon oxide or a silicon nitride is deposited on the sensing electrode 260. For another example, the encapsulation layer 410 may be formed such that an organic material such as polyethylene terephthalate (PET) and poly carbonate (PC) is applied on the sensing electrode 260. Here, the deposited organic material may not be introduced into the gap region 510 due to surface tension.

According to another embodiment, a portion of the sensing electrode 260 and a portion of the reference electrode 240 may be exposed. For example, one region of the encapsulation layer 410 may be removed by the etching process. Here, when viewed in a plan view, the exposed portion of the top surface of the sensing electrode 260 may not overlap the cavity 112. For example, the encapsulation layer 410, the sensing electrode 260, the second inter-electrode insulation layer 254, and the first inter-electrode insulation layer 252 may be etched to expose the top surface of the reference electrode 240. Here, when viewed in a plan view, the exposed portion of the top surface of the reference electrode 240 may not overlap the cavity 112.

In the pressure sensor according to the embodiments of the inventive concept, the partition wall is provided in the bulk silicon substrate to limit the region in which the cavity is provided. Due to this, the ultra-thin pressure sensor having a small thickness may be provided and the cavity having a desired shape may be easily provided as necessary.

The method for fabricating the pressure sensor according to the embodiments of the inventive concept performs the cavity forming and sealing process as a post process. Thus, the cavity having various inner pressures without restriction due to the post process may be formed, and the encapsulation layer may be formed by using various sealing materials.

The description of the present invention is intended to be illustrative, and those with ordinary skill in the technical field of the present invention will be understood that the present invention can be carried out in other specific forms without changing the technical idea or essential features. Thus, the above-disclosed embodiments are to be considered illustrative and not restrictive.

What is claimed is:

1. A pressure sensor comprising:
   a substrate having a cavity therein, wherein the cavity extends from a top surface toward a bottom surface of the substrate;
   a partition wall disposed in the substrate to surround the cavity, wherein the partition wall has an inner sidewall exposed by the cavity;
   a substrate insulation layer disposed on the top surface of the substrate to cover the cavity;
   a sensing unit disposed on the substrate insulation layer, wherein, when viewed in a plan view, at least a portion of the sensing unit overlaps the cavity; and
   an encapsulation layer disposed on the substrate insulation layer to cover the sensing unit.

2. The pressure sensor of claim 1, wherein the substrate insulation layer is connected to the partition wall to form one body.

3. The pressure sensor of claim 1, wherein the partition wall has a bottom surface lower than that of the cavity.

4. The pressure sensor of claim 1, wherein the sensing unit comprises a resistor.

5. The pressure sensor of claim 4, wherein the sensing unit is provided in plurality,
   the plurality of sensing units comprise first to fourth resistors contacting a top surface of the substrate insulation layer and arranged along a perimeter of the cavity,
   the first and third resistors face each other in a first direction, and the second and fourth resistors face each other in a second direction crossing the first direction, and
   the first and third resistors comprise sensing resistors, and the second and fourth resistors comprise reference resistors.

6. The pressure sensor of claim 4, further comprising a protective layer disposed between the substrate insulation layer and the encapsulation layer to cover the sensing unit, wherein the encapsulation layer extends into a through-hole passing through the substrate insulation layer and the protective layer over the cavity.

7. The pressure sensor of claim 1, wherein the sensing unit comprises:
   a reference electrode disposed on the substrate insulation layer; and
   a sensing electrode spaced apart from and disposed over the reference electrode, the sensing electrode being electrically insulated from the reference electrode,
   wherein a gap region is provided between the reference electrode and the sensing electrode over the cavity.

8. The pressure sensor of claim 7, wherein the gap region is connected to the cavity through a first through-hole passing through the substrate insulation layer and the reference electrode, and
   the encapsulation layer extends into a second through-hole passing through the sensing electrode over the cavity.

9. The pressure sensor of claim 8, wherein the first through-hole has a diameter greater than that of the second through-hole.

10. The pressure sensor of claim 1, wherein, when viewed in a plan view, the partition wall has a circular ring shape, an oval ring shape, or a ring shape having a triangular or more polygonal shape.

11. A method for manufacturing a pressure sensor, the method comprising:
    etching a substrate to form a trench having a closed loop when viewed in a plan view;
    forming an insulation film filled into the trench and covering a top surface of the substrate;
    forming a sensing unit on the insulation film;
    forming a cavity in the substrate; and
    forming an encapsulation layer covering the sensing unit on the substrate in which the cavity is formed,
    wherein one portion of the insulation film in the trench is defined as a partition wall, and
    the forming of the cavity in the substrate comprises removing a portion of the substrate, which is surrounded by the partition wall.

12. The method for claim 11, wherein the other portion of the insulation film covering the top surface of the substrate is defined as a substrate insulation layer, and
    the forming of the sensing unit comprises:
    depositing a piezo-resistive material on the substrate insulation layer; and
    patterning the deposited piezo-resistive material to form a resistor.

13. The method for claim 12, wherein, before the forming of the cavity, the method further comprises:
    forming a protective layer covering the sensing unit on the substrate insulation layer; and
    etching the substrate insulation layer and the protective layer to form a through-hole exposing the one portion of the substrate.

14. The method for claim 11, wherein the other portion of the insulation film covering the top surface of the substrate is defined as a substrate insulation layer, and
    the forming of the sensing unit comprises:
    forming a reference electrode on the substrate insulation layer;
    etching the reference electrode and the substrate insulation layer to form a first through-hole exposing the one portion of the substrate;
    forming a sacrificial layer filled into the first through-hole on the reference electrode;
    forming a sensing electrode covering the sacrificial layer;
    forming a second through-hole passing through the sensing electrode to expose the sacrificial layer; and
    removing the sacrificial layer through the second through-hole.

15. The method for claim 11, wherein the removing of the one portion of the substrate uses a wet etching process.

* * * * *